United States Patent [19]

Heaps et al.

[11] Patent Number: 4,517,327
[45] Date of Patent: May 14, 1985

[54] LOW TEMPERATURE CURABLE COATING COMPOSITION

[75] Inventors: John F. Heaps, Springfield; Dennis E. Erickson, Wilbraham, both of Mass.

[73] Assignee: Monsanto Company, St. Louis, Mo.

[21] Appl. No.: 574,238

[22] Filed: Jan. 26, 1984

[51] Int. Cl.$^3$ .......................... C08J 3/10; C08L 61/32; C08L 67/00; C08L 29/08
[52] U.S. Cl. .................. 524/315; 524/364; 524/376; 524/389; 524/512; 525/155
[58] Field of Search .............. 524/512, 315, 364, 376, 524/389; 525/155

[56] References Cited

U.S. PATENT DOCUMENTS

| 3,557,033 | 1/1971 | Brinton | 524/512 |
| 3,576,775 | 4/1971 | Jaegersburg | 524/512 |
| 3,864,300 | 2/1975 | Robey | 524/512 |
| 3,959,201 | 5/1976 | Chang | 260/850 |
| 3,978,015 | 8/1976 | Kolish | 524/512 |

Primary Examiner—C. Warren Ivy
Attorney, Agent, or Firm—Linda L. Lewis; R. Bruce Blance; Paul D. Matukaitis

[57] ABSTRACT

A process for preparing an improved low temperature curable water dispersed coating compositions comprising (1) forming a solution of an alkoxymethylmelamine and a styrene-allyl alcohol copolymer in a polar solvent and (2) adding to the solution an aqueous solution or dispersion of a hydroxyl-containing resin.

16 Claims, No Drawings

LOW TEMPERATURE CURABLE COATING COMPOSITION

BACKGROUND OF THE INVENTION

This invention relates to aqueous low temperature curable surface coating compositions. More particularly, it relates to a process for preparing improved water dispersed curable coating compositions comprising an aminoplast, a hydroxycopolymer and a hydroxyl containing resin.

It is well known in the coatings art to prepare coating compositions by dissolving in organic solvents an alkoxymethyltriazine or alkoxymethylurea and a hydroxy functional resin to provide coatings which exhibit satisfactory hardness. Because of greater environmental concerns today, efforts are being made to convert from solvent-based coatings to water-based coatings. Efforts are also being made to cure the coatings at low temperature to conserve energy and to utilize such coatings on substrates such as wood, paper, paper board and plastics that cannot survive high temperature cure. While it has been possible to use methoxymethylmelamines with hydroxyl functional resins in water based coatings to get satisfactory coating performance when the coatings are cured at high temperature, low temperature cure gives coatings that are soft, have poor water resistance and low gloss.

In solvent coating systems the addition of a styrene-allyl alcohol copolymer has been found to improve the properties of coatings cured at low temperatures. Until now, however, styrene-allyl alcohol copolymers have not been used with aqueous coating systems because of the insolubility of the copolymers and the difficulty of dispersing them in aqueous media.

In one attempt to use styrene-allyl alcohol copolymers, a solution of styrene-allyl alcohol copolymer in a methoxymethylmelamine was prepared and the solution was added to an aqueous dispersion of a hydroxy functional resin. The solution was prepared by adding the styrene-allyl alcohol copolymer to the aminoplast resin to give a concentration of up to 10 wt. % of the styrene-allyl alcohol copolymer by heating the aminoplast to the melting point of the styrene-allyl alcohol copolymer, about 100° C. or higher and sprinkling in the styrene-allyl alcohol copolymer as a powder. However, such solutions give viscosities of greater than 10,000 centipoise apparently because of interaction between the allyl alcohol groups and the aminoplast and are not dispersible in aqueous dispersions of hydroxy-functional resin. At temperatures below about 80° C., where interaction is minimized, styrene-allyl alcohol copolymer cannot be dissolved in the aminoplast resin even after lengthy periods of agitation. If the styrene-allyl alcohol copolymer is first melted and super-cooled to about 80° C. or lower, and added to the aminoplast, it immediately precipitates out and does not form the desired solution.

We have now discovered a method for dispersing a styrene-allyl alcohol copolymer in aqueous dispersions of hydroxy functional resins containing an aminoplast.

Our method is achieved by (1) forming a concentrated solution of an aminoplast and a styrene-(meth)allyl alcohol in a polar solvent and (2) adding to the solution an aqueous solution or dispersion of one or more hydroxy functional resins and mixing to obtain a uniform dispersion.

Another aspect of our invention is directed to the coating compositions provided by our process and to substrates coated with such compositions.

STYRENE ALCOHOL COPOLYMER

The styrene alcohol copolymers used in the preparation of the new compositions of the invention comprise the copolymers of styrene and allyl alcohol or methallyl alcohol. The molecular weight of the copolymers is in the range of about 1000 to about 2500 and the hydroxyl content is in the range of about 4.0 to about 10.0 weight percent and more preferably in the range of about 5.0 to about 8.0 weight percent.

THE AMINOPLAST

As used in this description the term "aminoplast" refers particularly to any of the large number of water soluble methylated amino resins which are commonly employed in the art of surface coatings. Such amino resins are characterized as being soluble in common solvents as distinguished from amino resins of the thermosetting type which are employed in molding or casting compositions. The aminoplasts which are suitable for the purpose of this invention are the methoxymethyl derivatives of urea and of polyamino triazines selected from the group consisting of melamine and methyl- and ethyl- guanamine.

the methoxymethylureas are prepared in the conventional manner by reaction of urea and formaldehyde under alkaline conditions followed by etherification with methanol under acid conditions to provide a condensate with an average degree of condensation of about 3 or less and a urea:formaldehyde: methanol ratio in the range of about 1:2-3:1-2.5. Preferably the ratio is in the range of about 1:2.2-2.8:1.3-2.2 and the ratio of formaldehyde: methanol is at least about 1.1.

The methoxymethylpolyaminotriazines are substantially completely methylolated polyaminotriazines substantially fully etherified with methanol. They are prepared by reaction of the polyaminotriazine with formaldehyde to methylolate the amino groups and are then alkylated or etherified by reaction with methanol. The etherified methylolated aminotriazines are liquid and are essentially monomeric or at most are oligomeric with an average degree of polymerization of no more than about 3, the aminotriazine rings being joined by methylene or methylene ether bridges formed by condensation of two methylol groups. Thus, the etherified aminotriazines within the scope of the invention possess a ratio of aminotriazine to combined formaldehyde in the range of about 1:2n-0.5 to about 1:2n where n is the number of amino groups per triazine ring and possess a ratio of aminotriazine to alkyl ether groups in the range of about 1:2n-1 to about 1:2n. The preferred aminotriazine is melamine since it has three amino groups per ring and is potentially hexafunctional. Thus, the more preferred aminotriazine compounds are the methoxymethyl melamines in which the ratio of melamine to combined formaldehyde is in the range of 1:5.5 to 1:6 and the ratio of melamine to methoxy groups is in the range of 1:5 to 1:6. Among the more preferred aminotriazine compounds is monomeric hexamethoxymethyl melamine.

THE AMINOPLAST STYRENE-ALLYL ALCOHOL COPOLYMER SOLUTION

The polar solvent used for preparing the aminoplast styrene-allyl alcohol copolymer solution can be any one or a mixture of solvents, advantageously of solubility parameter in the range of about 8.0 to about 15 and fractional polarity in the range of about 0.07 to about 0.7, such as alcohols, ketones, ethers, glycol ethers and acetates. Among the alcohols are those having from 1 to 5 carbon atoms per molecule including methyl, ethyl, propyl, butyl and amyl alcohols. In addition to alcohols, ketones, such as acetone, methyl ethyl ketone, methyl isobutyl ketone and methyl amyl ketone can be used. Examples of suitable acetates are ethyl, butyl and propyl acetate. Examples of suitable glycol ethers are methyl cellosolve, cellosolve and butyl cellosolve. Advantageously the solent is water soluble and a preferred solvent is ethanol and mixtures thereof.

In preparing solutions of the above components, several methods can be used. The aminoplast and the styrene-allyl alcohol copolymer can be dissolved individually in the polar solvent and then mixed together. The aminoplast can first be dissolved in the solvent and then the styrene-allyl alcohol copolymer added to the solution. The styrene-allyl alcohol copolymer may be dissolved first in the polar solvent and then the aminoplast added. The styrene-allyl alcohol copolymer and aminoplast can both be added at the same time to the solvent. In the preferred method, first either the styrene-allyl alcohol copolymer or the aminoplast is dissolved in the polar solvent and then the second component is added to the solution and dissolved. The solution is prepared at a temperature in the range of about 20° to about 80° C. Temperatures above about 80° C. should be avoided to prevent excessive interaction of the aminoplast and the copolymer.

Varying amounts of polar solvent can be used to dissolve the styrene-allyl alcohol copolymer and aminoplasts. Generally, at least 3 weight % solvent is needed to dissolve the aminoplast and/or styrene-allyl alcohol copolymer. Less than 3% will yield a solution that is too viscous. It is preferred that the amount of solvent used be in the range of 4 to 20 weight %. Preferably the amount of solvent used is sufficient to provide a solution viscosity of less than about 5000 cps to facilitate the dispersion of the solution in the aqueous dispersion of hydroxy functional resin.

THE HYDROXYL-CONTAINING RESIN

The hydroxyl-containing resin can be one of a number of commercially available resins. Advantageously the hydroxyl containing resin should have a hydroxyl content of from about 1.3 weight percent to about 10 weight percent, preferably about 2.0 to 6.0 weight percent. Hydroxyl content is defined as the weight ratio of hydroxyl groups per 100 parts of solid hydroxyl containing resin. Thus resin having one equivalent of hydroxyl groups per 100 parts of resin would have a weight percent hydroxyl content of 17/100 or 17 percent. Advantageously the hydroxyl-containing resin has an acid number of at least about 2 and preferably in the range of about 6 to about 12 and may be stabilized in aqueous dispersion by neutralization with ammonia or with a volatile amine or with a hydroxyamine such as dimethylethanolamine.

Examples of suitable resins are acrylic, and polyester resins which include the alkyd resins as are described below.

THE ACRYLIC RESINS

The acrylic resin used to prepare the coating composition is any of a number of commercially available water dispersible acrylic resins. The acrylic resin contains at least one ester of an alpha-olefinic monocarboxylic acid having the general formula:

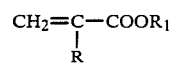

wherein R is either hydrogen or a lower alkyl group of from 1 to 4 carbon atoms, and $R_1$ represents an alkyl, hydroxy alkyl or cycloalkyl group of from 1 to 18 carbon atoms, and one or more of the comonomers of the formula:

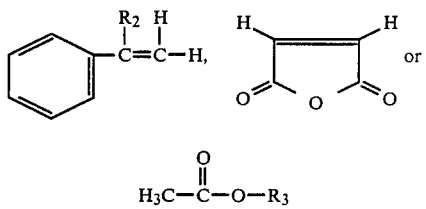

wherein
$R_2$ is H, $CH_3$ or $CH_2OH$; and
$R_3$ is alkene of 2 or 3 carbon atoms.

Examples of esters of alpha-olefinic monocarboxylic acids which may be used in the present invention include methyl acrylate, ethyl acrylate, propyl acrylate, isopropyl acrylate, butyl acrylate, hexyl acrylate, octyl acrylate, 2-ethyl hexyl acrylate, cyclohexyl acrylate, decyl acrylate, stearyl acrylate, methyl methacrylate, methyl alpha-ethyl acrylate, ethyl methacrylate, butyl methacrylate, butyl alpha-ethyl acrylate, hydroxy propyl acrylate and lauryl methacrylate.

Examples of the comonomers which may be used in the acrylics of the present invention are phenyl allyl alcohol, glycidyl methacrylate, styrene, α-methyl styrene, acrylic acid, methacrylic acid, maleic anhydride, allyl acrylate, vinyl acrylate, allyl acetate, vinyl acetate and ethyl methacrylate.

THE ALKYD RESINS

The alkyd resins used in preparing the compositions of this invention include those types normally used in baking or air drying applications. These resins can contain up to about 45 weight percent of an oil or fatty acid. When the fatty acid or oil concentration is increased above the 45 weight percent level cure response is diminished and the resulting films are soft and subject to mar and solvent attack. However, alkyd resins can be prepared which contain no fatty compound and are based upon polyols and polyacids only. These alkyd resins or oil-less alkyds are especially useful for exterior applications and have a high degree of flexibility, adhesion, and possess unique elongation properties. Preferably, though, the fatty compound should be present in the amount equal to about 20 to about 45 weight percent of the total alkyd resin solids with the most preferable range being about 35 to 45 weight percent.

In addition the particular alkyd resin which is chosen should have a solids acid value of at least 2. Lower acid value alkyds exhibit poor cure response and film resistance properties. Preferably the acid value of the selected alkyd should be in the 6 to 12 acid value range, however, alkyds with an acid value as high as 30 can also be employed with only minor stability problems.

When a fatty compound is present in the alkyd resins of this invention, it can comprise any of the fatty acids or oils ordinarily used in preparing alkyd resins. Included are the following oils and their respectively derived fatty acids: tall, safflower, tung, tallow, soya, corn, linseed, poppyseed, castor, dehydrated castor, perilla, cocoanut, oiticica, and the like. Of special usefulness are those fatty compounds wherein the fatty acid portion contains from 12 to 24 carbon atoms per molecule.

An additional component of this alkyd resins of this invention is a polyol or a mixture of polyols. Among the polyols which can be utilized are those normally used in producing alkyd resins including pentaerythritol, glycerine, trimethyol propane, trimethyol ethane and the various glycols such as neopentyl, ethylene and propylene. Preferable among the above types of polyols are triols or mixtures of a major amount of a triol and a minor amount of tetraalcohol.

Typical of the carboxylic acids, in addition to the aforementioned fatty acids, are phthalic anhydride, isophthalic acid, adipic acid, azelaic acid, benzoic acid, etc. These acids can readily be replaced by any of the additional acids normally used in alkyd resin processing. The preferred system in addition to including the aforementioned preferred levels of a fatty compound should contain an aromatic dibasic acid or a mixture of said aromatic acid with an aliphatic dibasic acid.

The amount of alkyd resin that can be blended with the other components of this invention can vary from 45 to 70 solids weight percent based on the total composition solids. Preferable results, though, are obtained when the alkyd resin is present in the 55 to 65 weight percent range.

THE POLYESTER RESIN

The polyester component of this invention may be saturated, unsaturated or oil-modified such as those polyesters well known in the art. Polyesters are prepared by reacting a polyhydric alcohol (polyol) and a polybasic acid.

Such polyols include ethylene glycol, propylene glycol, butylene glycol, diethylene glycol, dipropylene glycol, triethylene glycol, neopentyl glycol, trimethylene glycol, polyethylene glycol, polypropylene glycol, 1,5-pentanediol, trimethylolethane, trimethylolpropane, glycerol, 1,2,6-hexanetriol, pentaerythritol, sorbitol, mannitol, methyl glycoside, 2,2-bis(hydroxyethoxyphenyl) propane, 2,2bis (beta-hydroxypropoxyphenyl) propane and the like. Mono-functional alcohols may also be employed the supplement the other polyols and to control the molecular weight. Useful alcohols include those having a hydrocarbon chain comprising from about 3 to about 18 carbon atoms.

Generally, suitable diols include glycols of the formula $HO(CH_2)_nOH$ in which n is equal 2 to 10, glycols of the formula $HO(CH_2)_nH$ and $HO[CH(CH_3)CH_2O]_nH$, in which n equals 1 to 40. Specific diols that may be employed include, for example, 2,2-dimethyl-1,3propanediol, 2,2-diethyl-1,3-propanediol, 2,2-diethyl-1,3-propanediol, 2,2-diethyl-1,3-propanediol, 3-methyl-1,5-pentanediol, N-methyl and N-ethyl diethanol amines. Others include 4,4'-methylenbiscyclohexanol, 4,4'-isopropylidenebiscyclohexanol and various xylene diols, hydroxymethyl phenylethyl alcohols, hydroxymethyl-phenyl propanols, phenylene diethanols, phenylenedipropanols and heterocyclic diols such as 1,4-piperazinediethanol and the like.

Some of the preferred diols include 2-methyl-2-ethyl-1,3-propanediol, 2-ethyl-1,3-hexanediol and 2,2-dimethyl-3-hydroxypropyl 2,2-dimethyl-3-hydroxypropionate. Various other tri-functional polyols known in the art may be used.

The acid component of such polyesters may include unsaturated acids such as maleic acid, fumaric acid, itaconic acid, citraconic acid, glutaconic acid, mesaconic acid, and the like, and their corresponding anhydrides where such anhydrides exist. Other polycarboxylic acids which may be utilized in addition to the above-mentioned acids include saturated polycarboxylic acids such as succinic acid, glutaric acid, adipic acid, pimelic acid, suberic acid, azelaic acid, sebacic acid, and the like. Certain aromatic polycarboxylic acids and derivatives thereof may also be useful; for example, phthalic acid, tetrahydroxyphthalic acid, hexahydroxyphthalic acid, endomethylenetetrahydroxyphthalic anhydride, tetrachlorophthalic anhydride, hexachloroendomethylene tetrahydrophthalic acid, and the like. The term acid as used in this specification includes the corresponding anhydrides, where such anhydrides exist.

In many instances it is optional to include a fatty acid. These include saturated fatty acids such as decanoic, dodecanoic, tetradecanic, hexadecanic, octadecanic, iecosanic, docosanic, and the like. And in addition, unsaturated fatty acids may be used such as 9-octadecenoic, 9,12-octadecadieoic, 9,12,15-octadecatrienoic, 9,11,13-octadecatrienoic, 4-keto-9,11,13-octadecatrienoic, 12-hydroxy-9-octadeconic, 13-docosenic, and the like.

THE COATING COMPOSITIONS the components of the coating composition may be combined in various amounts. The amount of styrene-allyl alcohol copolymer in the composition is selected to provide the desired level of hardness in the cured coating and is advantageously from 1 to 7 weight % based on the total solids of the composition. The amount of aminoplast is selected to provide a sufficient concentration of methoxymethyl groups to provide an adequate degree of crosslinking by reaction with the hydroxy groups of the styrene-allyl alcohol copolymer and the hydroxy containing resin. Advantageously the concentration of methoxymethyl groups is in the range of about 0.2 to about 2 per hydroxy group. Within such limits the amount of aminoplast is generally selected so that the weight ratio of aminoplast to styrene-allyl alcohol copolymer is in the range of about 3:2 to about 50:1, preferably from about 2:1 to about 20:1 and the weight ratio of aminoplast to hydroxyl-containing resin is in the range of about 1:1 to about 1:10, and preferably from about 1:2 to about 1:9.

Dispersions of adequate viscosity for coating applications, advantageously have total solids from 30 to 70 weight %. The preferred range is 40 to 60%. The ratio of water to solvent in the coating composition is advantageously greater than 1:1 with a minimum amount of solvent being 10 weight % based on the total composition. The preferred ratio of water to solvent is from 6:1 to 2:1 with a solvent content of 10 weight percent or greater.

In order to achieve a solvent content of 10 weight % or greater, it may be necessary to add further solvent to the composition when adding the aqueous dispersion of the resin to the solution of aminoplast and styrene-allyl alcohol copolymer. The polar solvent added is not necessarily the same polar solvent used to form the solution of the aminoplast and styrene-allyl alcohol copolymer, i.e. a mixture of solvents can be used in the coating composition.

In order to achieve low temperature curing using the compositions of this invention an acid catalyst can be used. Included are catalysts such as para-toluenesulfonic acid, methanesulfonic acid, butyl acid phosphate, hydrochloric acid, and other organic and mineral acids having at least one active hydrogen group per molecule. Preferred among these catalysts is para-toluenesulfonic acid. Catalyst concentration can range from about 0.25 to about 6% based on the total weight of the final coating depending upon the final end use. Thus when the coating is to be employed as a wood sealer as low as 0.25 to 1.0% catalyst can be employed. On the other hand when the coating is to be used as a topcoat more complete cure is required and therefore from 2 to 6 weight percent catalyst may be used. It should be noted that since most of the above acid catalysts are crystalline at room temperature, solutions at about 50% solids in methanol or another solvent having a boiling point of less than about 162° C. may be used to facilitate handling.

The coating composition of the invention may be cooled with a pigment usually employed for coloring of such coating compositions such as an organic pigment, carbon black, titanium dioxide, and aluminum flake.

The coating composition of the invention may be also incorporated with other additives such as wetting agents, conditioning agents, flow control agents, promotors for cross-linking and antioxidants.

The application of the coating composition of the invention may be executed by a conventional method. That is, when employed as a solution, the composition is applied by brushing, roller coating, spraying with compressed air or with a petroleum solvent of low boiling point, electrostatic spraying, and when as powders, it is applied by electrostatical coating or fluidized bed coating.

The coating composition of the invention may be applied to a variety of materials such as wood, paper, paper board, glass, metal, stone, plastics and cloth.

Practical and presently preferred embodiments of the present invention are shown for illustration only in the following Examples wherein parts and percentages are by weight unless otherwise indicated.

TEST METHODS

Knoop Hardness Number (KHN) is determined by ASTM D-1474. The higher the value, the harder the coating.

Gloss is measured at 60°/20° according to ASTM-D573. Results are given in percent (%).

MEK rubs is a determination of solvent resistance made by rubbing a felt tipped marker, the tip of which is saturated with methyl ethyl ketone, over the cured coating and determining the number of rubs necessary to penetrate or dissolve the coating, exposing the bare substrate. A single rub constitutes moving the MEK saturated marker across the coating and back over the same path to the starting point. Results are given in number of rubs.

Cleveland Condensing Humidity Test is carried out according to ASTM D-2247-68 using a Cleveland Condensing Humidity Cabinet at 63° C.

Blistering is measured according to ASTM D-714 with the results reported in values of 1 to 10 wherein a value of 10 indicates no blistering.

EXAMPLES

Aminoplast A

An aminoplast solution is prepared by dissolving 10 parts of styrene allyl alcohol copolymer containing about 70 wt % styrene and 30 weight % allyl alcohol, of molecular weight 1700, in 4.3 parts ethanol at room temperature with agitation, adding 90 parts of a methoxymethyl melamine (MMM), with a melamine to formaldehyde to methanol ratio of about 1:5.7:5.5, and stirring until dissolved. The resulting aminoplast solution contains 96% by weight solids.

Aminoplast B

An aminoplast solution is prepared as Aminoplast A except that 20 parts of styrene allyl alcohol is used with 80 parts of the methoxymethylmelamine and 7 parts of ethanol and the solids content of the resulting solution is 94% by weight.

Comparative Aminoplast A

About 90 parts of the methoxymethylmelamine used in the preparation of Aminoplast A are heated to 60° C. and 10 parts of styrene-allyl alcohol copolymer flakes are mixed together for several days at 60° C. The styrene-allyl alcohol does not dissolve into the MMM.

Comparative Aminoplast B

The same procedure as for Comparative Aminoplast A is followed, except the mixture is heated to 100° C. The mixture becomes extremely viscous and cannot be dispersed in an aqueous dispersion of hydroxyl-containing resin.

Acrylic A

An acrylic resin is used which is a hydroxyl functional acrylic aqueous emulsion polymer containing 46% by weight solids.

CONTROL C-1 AND EXAMPLE 1

Coating compositions shown in Table I are prepared by mixing Acrylic A with butyl cellosolve and an aminoplast. The coatings are applied with draw down blades at room temperature to cold rolled steel pannels treated with zinc phosphate and primed with a pigmented epoxy coating about 1 mil thick and baked at 162° C. for 30 min. The films are baked for 15 min. at 121° C.

A comparison of the the coating properties of Control C-1 and Example 1, shown in Table I, shows a slightly poorer gloss of coatings with styrene-allyl alcohol copolymer but superior weatherability upon exposure to the QUV weatherometer, demonstrated by reduced blistering.

TABLE I

| METAL COATINGS | | |
|---|---|---|
|  | C-1 | Ex-1 |
| Acrylic A | 65 | 65 |
| Butyl Cellosolve | 5 | 5 |
| MMM | 3.5 |  |
| Aminoplast A |  | 3.5 |
| KHN[1] | 5.2 | 4.6 |
| Gloss (20°)[2] | 87 | 79 |
| MEK Rubs | 10 | 10 |

TABLE I-continued

| METAL COATINGS | | |
|---|---|---|
| | C-1 | Ex-1 |
| QUV[3] | | |
| Gloss | 77 | 76 |
| Blister | 9 | 9.5 |

[1]Samples tested more than 48 hours after baking.
[2]Samples tested more than one week after baking.
[3]Samples tested after 47.6 hours of exposure.

EXAMPLES 2–5 AND CONTROL 2–5

Examples 2–5 and Controls 2–5 shown in Table II are prepared by mixing 17 parts of an unneutralized therosetting water dispersible acrylic resin containing 70% solids in secondary butyl alcohol, 1 part dimethylethanol amine and 12 parts water. Examples 2–5 contain 6 parts of Aminoplast B (which contains MMM and styrene allyl alcohol copolymer) and 4.7 parts catalyst. Controls 2–5 contain 6 parts MMM and 4.7 parts catalyst. Two catalysts are evaluated: phenyl acid phosphate (PAP) and a commercial catalyst called Nacure-155 sold by King Industries. The samples are coated on panels as described in Example 1. The baking temperature is varied as indicated in Table II and the samples tested.

As can be seen by comparing the control samples to the examples, the addition of styrene-allyl alcohol to the aminoplast improves hardness for all the examples and gloss for all except Example 4. The improvement in gloss also indicates improved water resistance, since the test involves exposure to condensing water.

TABLE II

| | METAL COATINGS | | | | | | | |
|---|---|---|---|---|---|---|---|---|
| | C-2 | Ex-2 | C-3 | Ex-3 | C-4 | Ex-4 | C-5 | Ex-5 |
| PAP | 4.7 | 4.7 | | | 4.7 | 4.7 | | |
| NaCure | — | | 4.7 | 4.7 | | | 4.7 | 4.7 |
| Baking Temp. (30 min.) °C. | 104 | 104 | 104 | 104 | 121 | 121 | 121 | 121 |
| KHN[1] | 1.7 | 5.1 | 2.4 | 4.7 | 5.3 | 6.7 | 8.9 | 9.0 |
| QUV[2] Gloss (20°) | * | 8 | * | 7 | 27 | 17 | 38 | 40 |

[1]Samples tested after 48 hours.
[2]Samples tested after 200 hours of exposure.
* Films too soft to withstand 24 hrs. exposure.

We claim:

1. A process for preparing a coating composition which comprises:
   (1) forming a solution of a water-soluble aminoplast selected from the group consisting of methoxymethyl derivatives of urea, melamine and methyl- and ethyl-guanamines and a styrene-(meth)allyl alcohol polymer in a polar solvent wherein the ratio of the aminoplast to styrene-(meth)allyl alcohol copolymer is in the range of about 3:2 to about 50:1 by weight; and
   (2) adding the solution to an aqueous solution or dispersion of a hydroxyl-containing resin and mixing to obtain a uniform dispersion;
wherein the styrene-(meth)allyl alcohol copolymer has a molecular weight in the range of about 1000 to about 2500 and a hydroxyl content in the range of about 4.0 to about 10.0 weight percent and wherein the hydroxyl containing resin is selected from the group consisting of acrylic, and polyester hydroxyl-containing resins containing about 1.3–10 weight % hydroxyl and an acid number in the range of about 2 to about 12.

2. The process according to claim 1 wherein the aminoplast is a methoxymethylmelamine and the styrene-(meth)allyl alcohol copolymer has a hydroxyl content in the range of about 5.0 to about 8.0 weight percent.

3. The process according to claim 2 wherein the methoxymethylmelamine has a combined ratio of melamine to formaldehyde to methanol in the range of about 1:5.5:5 to about 1:6:6.

4. The process according to claim 1 wherein the polar solvent is selected from the group consisting of alcohols, ketones, ethers, glycol ethers and acetates.

5. A process for preparing a coating composition which comprises:
   (1) forming a solution of a water-soluble aminoplast selected from the group consisting of methoxymethyl derivatives of urea, melamine and methyl- and ethyl-guanamines and as styrene-(meth)allyl alcohol copolymer in at least 3 parts per hundred of a polar solvent wherein the ratio of aminoplast to styrene-(meth)allyl alcohol copolymer is in the range of about 3:2 to about 50:1 by weight;
   (2) adding to the solution an aqueous dispersion of one or more hydroxyl-containing resins and mixing to obtain a uniform dispersion wherein the ratio of aminoplast to hydroxyl-containing resin is in the range of about 1:1 to about 1:10; and
   (3) adding a polar solvent to the dispersion or solution to achieve a solvent content of 10 weight % or greater of the total coating composition and a ratio of water to solvent of at least about 1:1,
wherein the styrene-allyl alcohol copolymer has a molecular weight in the range of about 1000 to 2500 and a hydroxyl content in the range of about 4.0 to 10.0 weight percent and comprises from about 1 to about 7 weight percent of the total solids of the coating composition; wherein the total solids of the coating composition is from 30 to 70 weight percent; and wherein the hydroxyl-containing resin is selected from the group consisting of acrylic, and polyester hydroxyl-containing resins containing about 1.3–10 weight % hydroxyl and an acid number in the range of about 2 to about 12.

6. The process according to claim 5 wherein the aninoplast is a methoxymethylmelamine and the polyol is a styrene-allyl alcohol copolymer with a hydroxyl content of about 5.0 to about 8.0 weight percent.

7. The process according to claim 6 wherein the methoxymethylmelamine has a combined ratio of melamine to formaldehyde to methanol in the range of about 1:5.5:5 to about 1:6:6.

8. The process of claim 5 wherein the ratio of water to polar solvent is in the range of 6:1 to 2:1.

9. A process for preparing a coating composition which comprises:
   (1) forming a solution of styrene-allyl alcohol copolymer with a molecular weight in the range of about 1000 to 2500 and a hydroxyl content of about 4.0 to about 10.0 and hexamethoxymethylmelamine in at least 3 parts per hundred of a polar solvent wherein the ratio of hexamethoxymethylmelamine and styreneallyl alcohol copolymer is in the range of about 3:2 to 50:1;
   (2) adding to the solution an aqueous solution or dispersion of one or more hydroxyl-containing resins and mixing to obtain a uniform dispersion wherein the ratio of hexamethoxymethylmelamine to hydroxyl-containing resin is in the range of about 1:1 to about 1:10; and (3) adding a polar solvent to the dispersion or solution to achieve a solvent content of 10 weight percent or greater of the total coating composition and a ratio of water to solvent of at least about 1:1; wherein about 1 to about 7 weight percent of the total solids of the coating composition is the styrene-allyl alcohol copolymer; wherein the total solids of the coating composition is from 30 to 70 weight; and wherein the hydroxyl-containing resin is selected from the group consisting of acrylic, and polyester hydroxyl-containing resins containing about 1.3–10 weight % hydroxyl and an acid number in the range of about 2 to about 12.

10. The process of claim 9 wherein the ratio of water to polar solvent is in the range of 6:1 to 2:1.

11. The coating composition prepared by the process of claim 1.

12. The coating composition prepared by the process of claim 5.

13. The coating composition prepared by the process of claim 9.

14. An article coated with the coating composition of claim 11.

15. An article coated with the coating composition of claim 12.

16. An article coated with the coating composition of claim 13.

* * * * *

UNITED STATES PATENT AND TRADEMARK OFFICE
CERTIFICATE OF CORRECTION

PATENT NO. : 4,517,327
DATED : May 14, 1985
INVENTOR(S) : John F. Heaps, Dennis E. Erickson It is certified that error appears in the above-identified patent and that said Letters Patent are hereby corrected as shown below:

Column 2, line 28 "the" should read --The--
Column 5, line 11 "An additional component of this alkyd resins of this" should read --An additional component of the alkyd resins of this--
Column 5, line 60 "1,3propanediol," should read --1,3-propanediol--
Column 5, line 63 "4,4'-methylenbiscyclohexanol" should read --4,4'-methylenebiscyclohexanol--
Column 6, line 35 "the" should read --The--
Column 7, line 27 "cooled" should read --colored--
Column 8, line 48 "pannels" should read --panels--
Column 9, line 14-15 "thero-setting" should read --thermo-setting--
Column 10, line 61 "styreneallyl" should read --styrene-allyl- Signed and Sealed this Twenty-ninth Day of October 1985

[SEAL]

Attest:

DONALD J. QUIGG

Attesting Officer

Commissioner of Patents and Trademarks—Designate